United States Patent Office 3,290,158
Patented Dec. 6, 1966

3,290,158
PROCESS OF PRODUCING FREE FLOWING
SODIUM CHLORIDE
Ralph O. Treat, Havre de Grace, Md., assignor to J. M. Huber Corporation, Locust, N.J., a corporation of New Jersey
No Drawing. Filed Mar. 27, 1963, Ser. No. 268,477
5 Claims. (Cl. 99—143)

This invention relates to a novel method of adding conditioners and parting agents to hygroscopic materials which have a tendency to cake and solidify upon exposure to moisture.

For example, it is well known that crystalline sodium chloride tends to absorb water upon standing in atmospheric air of normal humidity to such an extent that the crystals tend to coalesce and bridge, with the result that caking and lumps occur and the salt is no longer free flowing.

Other well known products become caked or coalesced and lumpy upon exposure to moisture, among them are, for example, sugar, mixed and single salt fertilizers, explosives, alkali metal silicates, calcium chloride, animal feeds and feed supplements, permanganates, dehydrated food products, fruit juice powders, meat curing mixtures, pharmaceuticals, seasonings, vitamin concentrates, soluble coffee and the like.

In order to overcome this problem, various conditioners have been used which successfully protect the materials from caking and lumpiness as well as maintaining their flowability.

The usual method of adding conditions to hygroscopic materials is to mix the dry conditioner with dry material. The amounts of conditioner used varies with the material conditioned and the conditioner used, however, the usual practice is to use about 0.1% to about 5% based upon the dry weight of the material conditioned. When this method of dry conditioning is used, several serious problems arise, namely, shotballing, lumps, conditioner separation and dusting occur which results in a loss of conditioner and some cases, an undesirable product. Efforts to completely overcome these problems have heretofore been unsuccessful.

It is therefore an object of this invention to provide an economical and effective process for conditioning hygroscopic materials.

It is a further object of this invention to provide a dustless process for producing free-flowing sodium chloride.

Other objects and advantages of this invention will become apparent from the following specification.

My invention is applicable to hygroscopic powdered or granular materials which are derived in wet or moist form and require drying prior to final processing, a typical example of such a material is sodium chloride or common salt. Without intending to limit the scope of my invention, I will describe it as applied to common salt. It is to be understood that the process of this invention can also be applied to other products which exhibit hygroscopicity, caking and poor flow properties unless conditioned.

The conditioners which can be used in the process of this invention are the well known insoluble commercial conditioners which can be utilized in an aqueous slurry. These are the siliceous conditioners such as finely divided metal silicates, pyrogenic silica, finely divided precipitated silica, calcium silicate, sodium alumino silicate, colloidal silica, clay and the like. Other conditioners which can be used in the process of this invention are magnesium carbonate and tricalcium phosphate and the like. Mixtures of these conditioners can also be used.

I have discovered that by adding a high solids aqueous slurry of conditioner, generally from about 1% to 60% solids content to the material to be conditioned, a satisfactory level of conditioning effectiveness is obtained with no undesirable side effects such as dusting, shotballing or lumps. The products are free-flowing.

Sodium chloride, for example, is produced or recovered by several methods: (a) solar evaporation of brines from various sources (b) quarrying of solid salt (c) mining of solid salt (d) burning of salt containing plants, using the ashes as such (e) evaporation of brine on burning wood (f) evaporation of brine in vessels (g) leaching of salt-impregnated peat or peat ashes, and muds, followed by evaporation of brine (h) sublimation of sea water, ice or sodium chloride dihydrate in cold climates (i) recovery of co-product or by-product salt from chemical reactions.

One of the most widely accepted commercial methods of salt recovery is by evaporation in a vessel, usually a vacuum pan. The present invention is applicable to any wet method of salt recovery; however, without intending to limit the scope of the invention, it will be described by reference to the vacuum pan method. This method consists of feeding weak brine into the pan continually and letting it evaporate to partial dryness, resulting in a supersaturated brine solution. Cubic crystals of granulated sodium chloride are formed and drop out. The crystals are removed to a drum filter where most of the excess brine is removed. The wet sodium chloride crystals are discharged from the filter into a conveyor which feeds it into a rotating dryer where the sodium chloride is completely dried. The dried crystals are then mixed with the dry conditioner. The conditioners effectively coat and adhere to the crystals and act as a moisture absorbant and parting agent, which to a large degree prevents caking and enhances flow. When the sodium chloride and conditioner are mixed together, the conditioner tends to roll up or un-mix, forming small beads or shot-balls which are plainly visible to the naked eye and are not desirable. The shot balls are removed by the use of vibratory scalping screens. This, of course is an added expense and also results in loss of conditioner. The conditioners are usually in the form of light fluffy powders and as a result there is much dusting throughout the conditioning operation.

According to the process of this invention these problems are eliminated and there is improved conditioning effect.

In accordance with the process of my invention a high solids aqueous slurry of conditioner, generally from about 1% to 60% solids content, is added to the wet sodium chloride crystals as they are removed from the filter in the operation hereinbefore described. The mixing in the conveyor and rotating dryer thoroughly coats the wet sodium chloride crystals with conditioner. As the water is removed the brine crystallizes and holds the conditioner particles firmly attached to the parent crystal. A microscopic examination of the sodium chloride crystals conditioned according to the process of this invention, reveals that the crystals are uniformly coated with conditioner with a complete absence of shotballs, dust or lumps.

Th following non-limiting examples are illustrative of the invention.

EXAMPLE 1

0.6 gm. water was added with mixing to 200 grams of dry sodium chloride crystals. 6 gms. of a 25% solids aqueous slurry containing 1.5 gms. sodium alumino silicate salt conditioner was added to the wet sodium chloride and thoroughly mixed. The mixture was dried completely at 250° F. with intermittent agitation. The product was tested for conditioning efficiency, the results are shown in Table I.

EXAMPLE 2

0.6 gm. of water was added with mixing to 200 grams of dry sodium chloride. 7.5 gms. of a 20% solids aqueous slurry of calcium silicate conditioner containing 1.5 gms. of calcium silicate was added to the wet sodium chloride and thoroughly mixed. The mixture was dried at 250° F. with intermittent agitation. The product was tested for conditioning efficiency, the results are shown in Table I.

EXAMPLE 3

0.6 gm. of water was added with mixing to 200 grams of dry sodium chloride. 6 grams of a 25% solids aqueous slurry of tricalcium phosphate (TCP) conditioner containing 1.5 gms. of TCP were added to the wet sodium chloride and thoroughly mixed. The mixture was dried at 250° F. with intermittent agitation. The product was tested for conditioning efficiency, the results are shown in Table I.

EXAMPLE 4

0.6 gram of water was added with mixing to 200 gms. of dry sodium chloride. 10 grams of a 15% solids aqueous slurry of magnesium carbonate conditioner containing 1.5 grams of magnesium carbonate was added to the wet sodium chloride and thoroughly mixed. The mixture was dried at 250° F. with intermittent agitation. The product was tested for conditioning efficiency, the results are shown in Table I.

While the examples show only a small number of conditioners, any insoluble commercial conditioner which can be slurried in water can be used according to this invention.

An example of a sodium alumino silicate useful in this invention is one with the following chemical and physical properties:

Chemical composition: Percent by weight
$SiO_2$ _____ 67–71
$Al_2O_3$ _____ 11–12
$Na_2O$ _____ 5.5–6.5
Ignition loss _____ 7.5–9.0

(Iron, calcium and titanium compounds, together with sulfates, make up the difference.)

Physical properties:
Color _____ White
Form _____ Powder
Specific gravity _____ 2.1
Mean particle diameter, millimicrons _____ 40
BET surface area, m.²/gm. _____ 72
Refractive index _____ 1.55
pH (20% slurry) _____ 9.5–10.5
Screen residue (325 mesh), percent maximum _____ 0.1
Free moisture, percent maximum _____ 5

A typical calcium silicate useful in this invention has the following chemical and physical analysis:

Chemical composition: Percent by weight
$SiO_2$ _____ 64
CaO _____ 18
Ignition loss _____ 15

(Iron, aluminum, magnesium and sodium compounds together with chlorides make up the difference.)

Physical properties:
Color _____ White
Form _____ Powder
Specific gravity _____ 2.1
Mean particle diameter, microns _____ 0.030
BET surface area, m.²/gm. _____ 80
Refractive index _____ 1.47
pH (5% slurry) _____ 10.0
Free moisture, percent _____ 5

A typical silica useful in this invention is described in U.S. Patent 2,768,898 as being finely divided, precipitated, hydrated having the composition $H_2O \cdot (SiO_2)_x$ where $x$ is 3 to 50, having a surface area of 75 to 200 m.²/gm. and an average ultimate particle size below 0.1 micron.

The following table compares the effects on conditioning efficiency when using the known dry method of conditioning and the novel wet method of this invention.

Table I

| Conditioner | Percent Conditioner, based upon the dry weight of the salt | | Percent Conditioned Separated | | Percent Water required to cake, based upon the dry weight of the conditioned salt | | Percent Moisture pickup at 93% RH based upon the dry weight of the conditioned salt | | Percent Caking of conditioned salt at 93% RH | |
|---|---|---|---|---|---|---|---|---|---|---|
| | Wet Cond. | Dry Cond. | Wet Cond. | Dry Cond. | Wet Cond. | Dry Cond. | Wet Cond. | Dry Cond. | Wet Cond. | Dry Cond. |
| Sodium alumino silicate | 0.66 | 0.71 | 4.10 | 9.60 | 0.68 | 0.64 | 0.55 | 0.66 | 0.00 | 10.0 |
| Magnesium carbonate | 0.62 | 0.63 | 4.50 | 9.60 | 0.60 | 0.52 | 0.61 | 0.68 | 2.70 | 5.2 |
| Calcium silicate | 0.76 | 0.83 | 8.50 | 47.70 | 0.88 | 0.88 | 0.59 | 0.67 | 1.20 | 6.4 |
| Tricalcium phosphate | 0.82 | 0.75 | 2.73 | 32.30 | 0.46 | 0.44 | 0.58 | 0.65 | 10.00 | 30.0 |

From the above data it is apparent that the process of this invention provides sodium chloride crystals in a free-flowing, non-caking condition which is at least as good as that produced by the prior art methods and in some cases is superior.

As can be seen from the table, the amounts of conditioner on the salt achieved by either the dry conditioning method or the novel wet conditioning method are of the same magnitude. However, the process of this invention more effectively attaches the conditioner to the salt as can be seen by the amount of conditioner separated upon vibration. The conditioner separation test is a measure of the shot-balling and dusting tendency of the conditioner as well as the strength of the attachment to the conditioned material. This test is carried out by shaking the conditioned material on a 150 mesh sieve for 30 seconds at 280 oscillations per minute, followed by measuring the amount of conditioner separated.

The salt conditioned by the process of this invention has a greater moisture tolerance than the salt conditioned by the dry methods. This means that it requires more moisture to cause the salt to lose its flowability when it is conditioned by the process of this invention than when conditioned by prior art methods. The salt is also significantly more moisture resistant in high relative humidities when conditioned by the wet method of this invention than when conditioned by prior art dry methods.

The salt, when conditioned by the wet method exhibits superior caking resistance when compared to salt conditioned by conventional dry methods.

The process of this invention is therefore a significant improvement over those presently in use since the dusting, shot-balling and lumpiness problems are eliminated.

The sodium chloride may contain other materials, such as sodium or potassium iodide and like materials commonly used in edible sodium chloride.

Although this invention has been described with reference to limited representative embodiments, these embodiments are not intended to limit the scope of the invention except insofar as included in the following claims.

I claim:

1. The process of producing a stable, free flowing, cake resistant sodium chloride composition which consists essentially of mixing a sufficient amount of an aqueous slurry containing 1% to 60% by weight of an insoluble finely divided conditioner selected from the group consisting of siliceous conditioners, magnesium carbonate, tricalcium phosphate, and mixtures thereof with briney sodium chloride crystals to coat said sodium chloride crystals with from 0.1% to 5% of said conditioner, based upon the weight of dry sodium chloride, and subsequently drying the mixture.

2. The process of claim 1 wherein said siliceous conditioner is finely divided sodium aluminosilicate.

3. The process of claim 1 wherein said siliceous conditioner is finely divided calcium silicate.

4. The process of claim 1 wherein said conditioner is finely divided magnesium carbonate.

5. The process of claim 1 wherein said conditioner is finely divided tricalcium phosphate.

References Cited by the Examiner

UNITED STATES PATENTS

| | | | |
|---|---|---|---|
| 2,399,987 | 5/1946 | Cordie et al. | 71—64 |
| 2,664,357 | 12/1953 | Miller | 99—143 |
| 2,768,898 | 10/1956 | Waldo | 99—143 |
| 2,768,899 | 10/1956 | Waldo | 99—143 |
| 2,845,354 | 7/1958 | Ogawa et al. | 99—143 |
| 2,854,341 | 9/1958 | Waldo | 99—143 |
| 2,990,246 | 6/1961 | Scott et al. | 23—89 |
| 3,013,884 | 12/1961 | Fellers | 99—143 |
| 3,027,249 | 3/1962 | Jost | 71—64 |

DONALL H. SYLVESTER, *Primary Examiner.*

ANTHONY SCIAMANNA, *Examiner.*

H. R. CAINE, *Assistant Examiner.*